(12) United States Patent
Foster

(10) Patent No.: US 11,214,404 B2
(45) Date of Patent: Jan. 4, 2022

(54) MEASURING DEVICE ASSEMBLY

(71) Applicant: Samuel Foster, Havertown, PA (US)

(72) Inventor: Samuel Foster, Havertown, PA (US)

( * ) Notice: Subject to any disclaimer, the term of this patent is extended or adjusted under 35 U.S.C. 154(b) by 167 days.

(21) Appl. No.: 16/035,036

(22) Filed: Jul. 13, 2018

(65) Prior Publication Data

US 2018/0319540 A1 Nov. 8, 2018

Related U.S. Application Data

(63) Continuation-in-part of application No. 15/919,577, filed on Mar. 13, 2018, which is a continuation of application No. 15/220,904, filed on Jul. 27, 2016, now Pat. No. 9,950,837, which is a continuation of application No. 13/492,183, filed on Jun. 8, 2012, now Pat. No. 9,428,303.

(51) Int. Cl.
| | | |
|---|---|---|
| *B65D 23/12* | (2006.01) | |
| *B65D 1/02* | (2006.01) | |
| *B65D 21/02* | (2006.01) | |
| *B65D 41/56* | (2006.01) | |
| *G01F 19/00* | (2006.01) | |
| *B65D 69/00* | (2006.01) | |

(52) U.S. Cl.
CPC ........... *B65D 23/12* (2013.01); *B65D 1/0284* (2013.01); *B65D 21/0204* (2013.01); *B65D 41/56* (2013.01); *G01F 19/00* (2013.01); *B65D 69/00* (2013.01)

(58) Field of Classification Search
CPC .. B65D 23/12; B65D 1/0284; B65D 21/0204; B65D 69/00; B65D 41/56; G01F 19/00
USPC ........ 220/23.86, 223, 23.83; 206/223, 23.83, 206/23.86; 215/377, 376, 378, 370, 390, 215/387, 386, 6, DIG. 7
See application file for complete search history.

(56) References Cited

U.S. PATENT DOCUMENTS

| | | | |
|---|---|---|---|
| 9,382,049 B2 * | 7/2016 | Kershner | B65D 50/043 |
| 10,336,496 B2 * | 7/2019 | Zimmer | B65D 21/0228 |
| 10,392,239 B2 * | 8/2019 | French | B65D 47/265 |
| 2011/0049167 A1 * | 3/2011 | Martin | B65D 23/001 |
| | | | 220/630 |
| 2013/0037426 A1 * | 2/2013 | Shen | B65D 21/0204 |
| | | | 206/216 |

* cited by examiner

*Primary Examiner* — Anthony D Stashick
*Assistant Examiner* — James M Van Buskirk
(74) *Attorney, Agent, or Firm* — Barley Snyder

(57) ABSTRACT

A measuring device assembly having a container and measuring receptacle. The container includes a self-supporting base structure with a plurality of projections extending downward therefrom, wherein each projection of the plurality of projections includes a fastener receiving groove extending inward thereof. The measuring receptacle includes a receptacle base, a side wall extending from an upper surface of the receptacle base, and a fastener extending inward and secured in the fastener receiving groove.

8 Claims, 15 Drawing Sheets

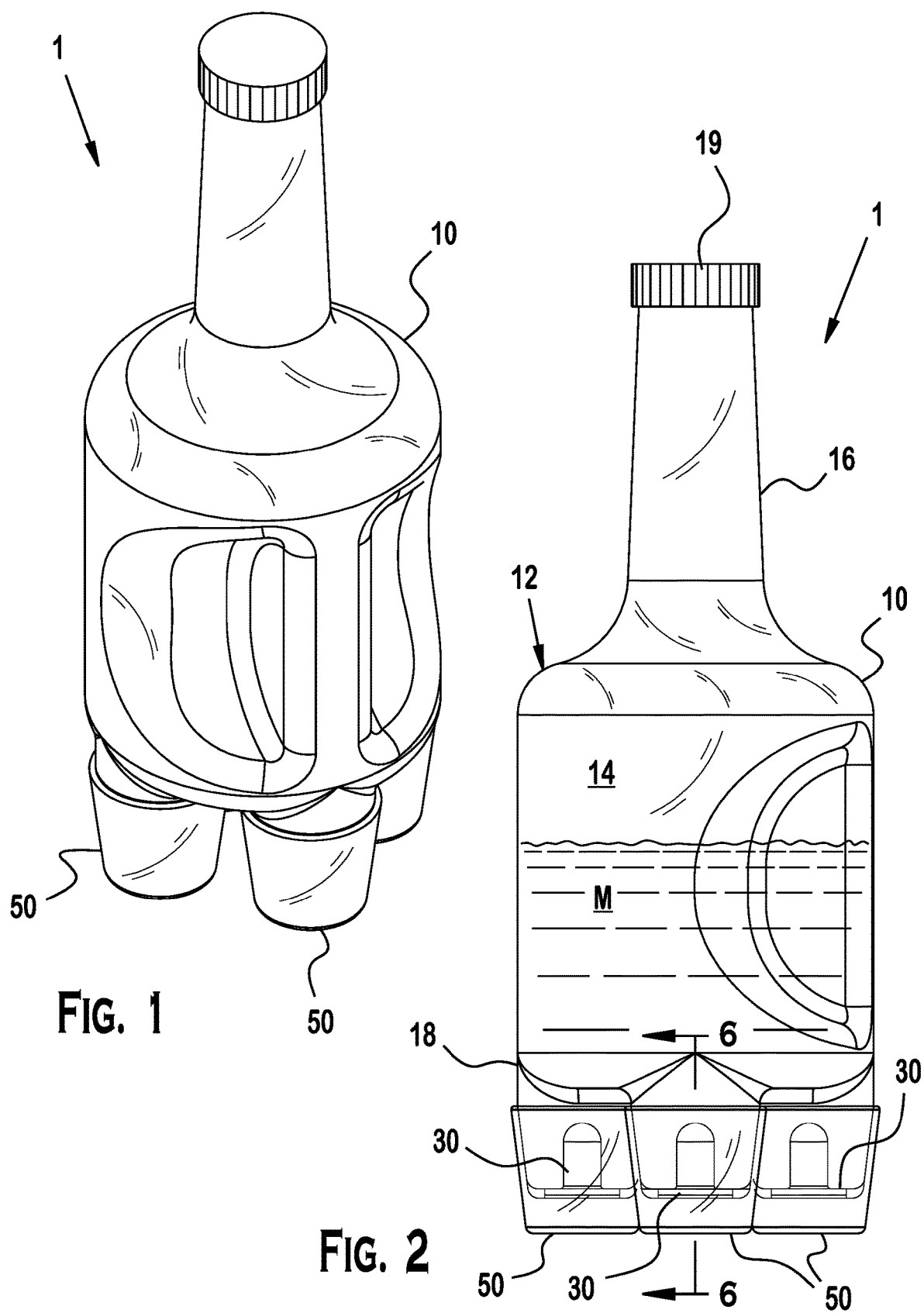

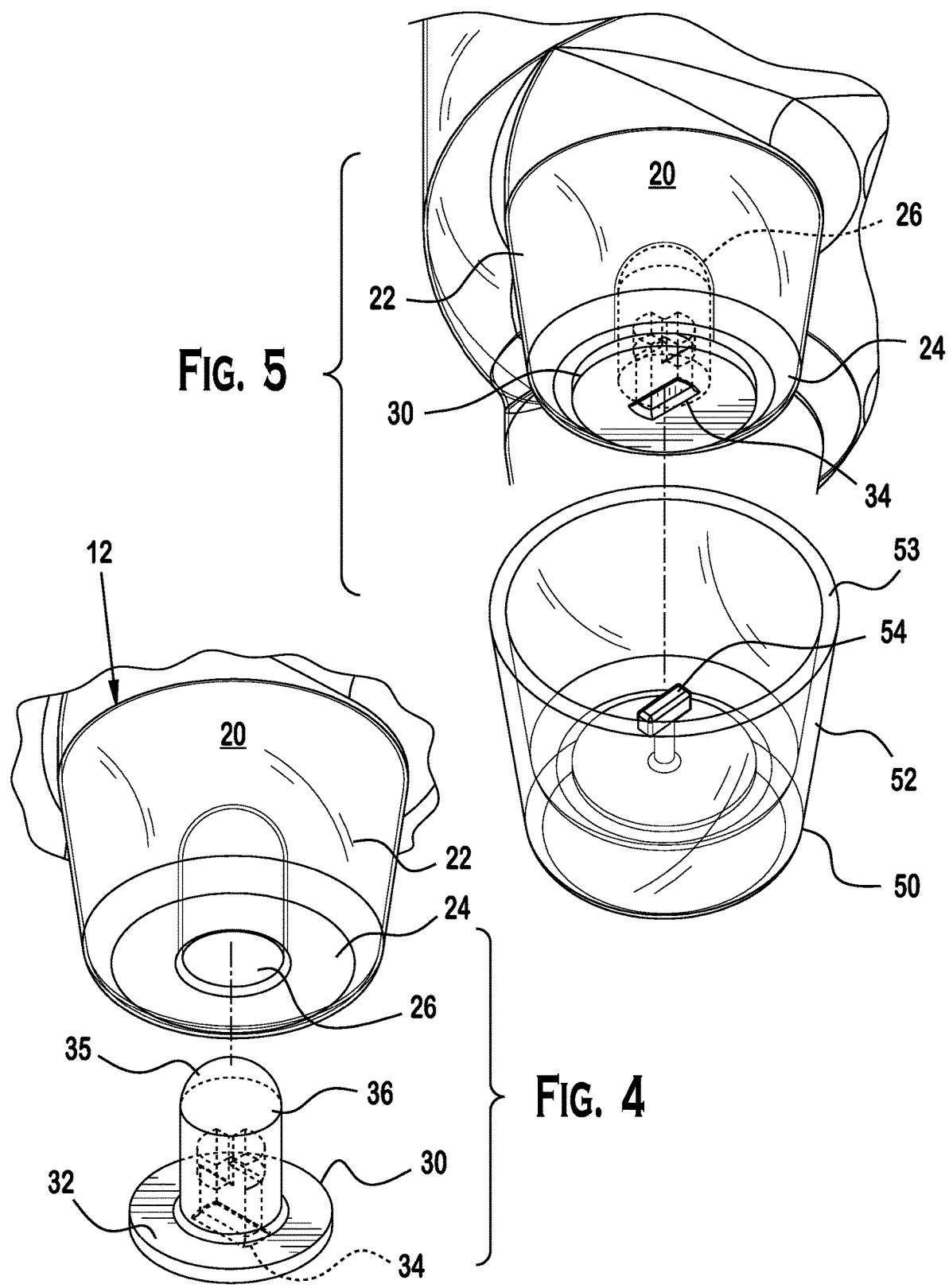

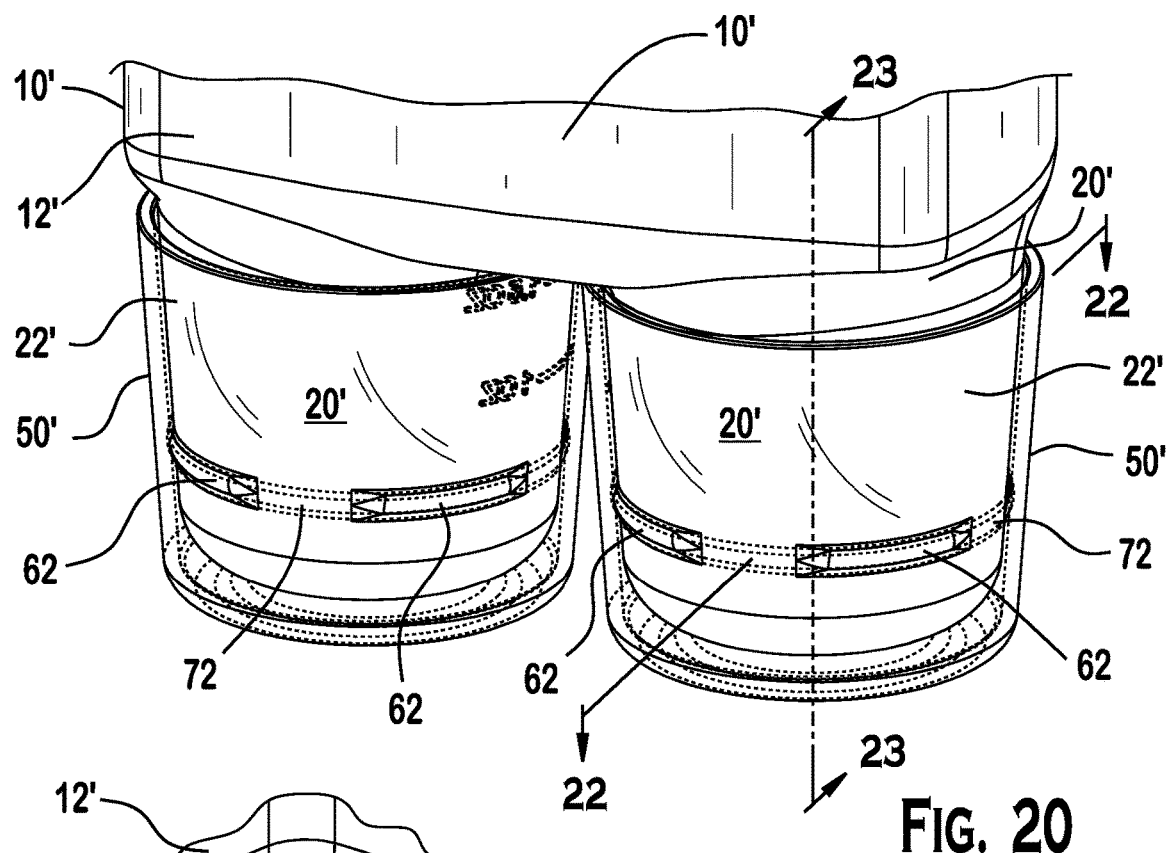
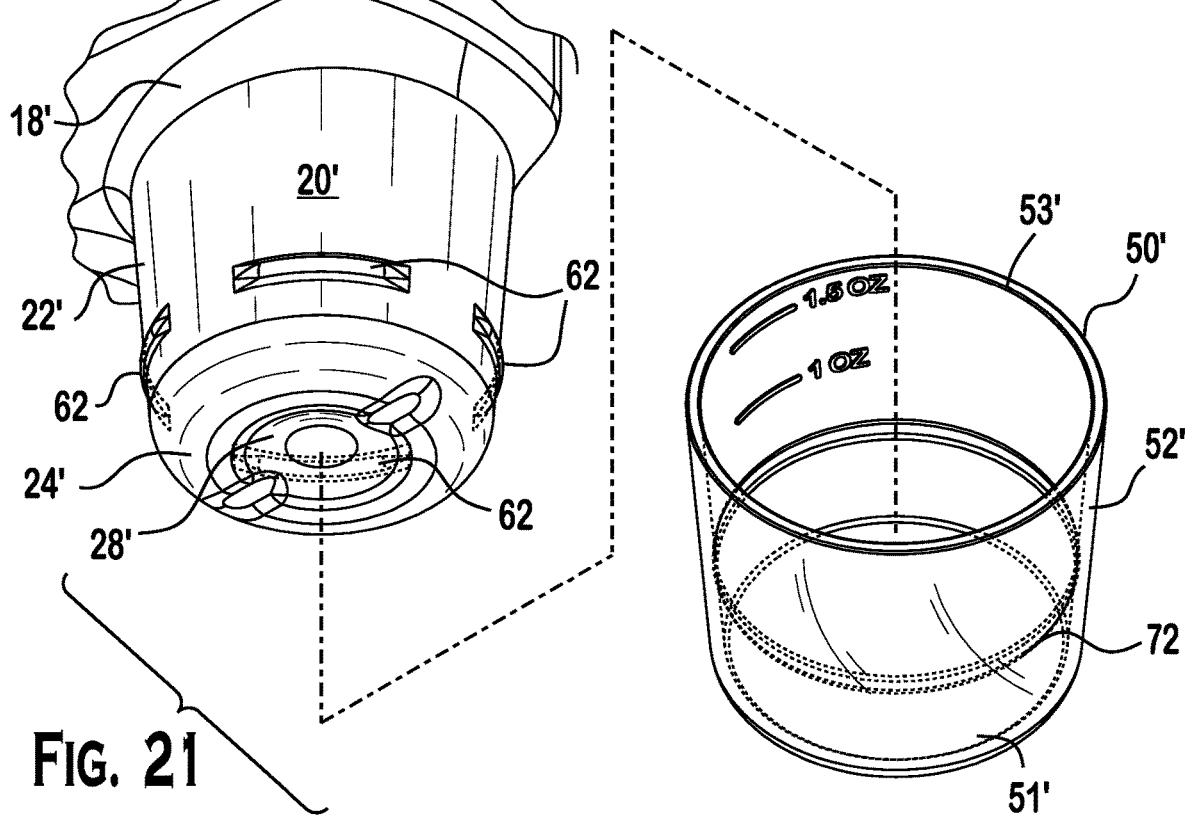

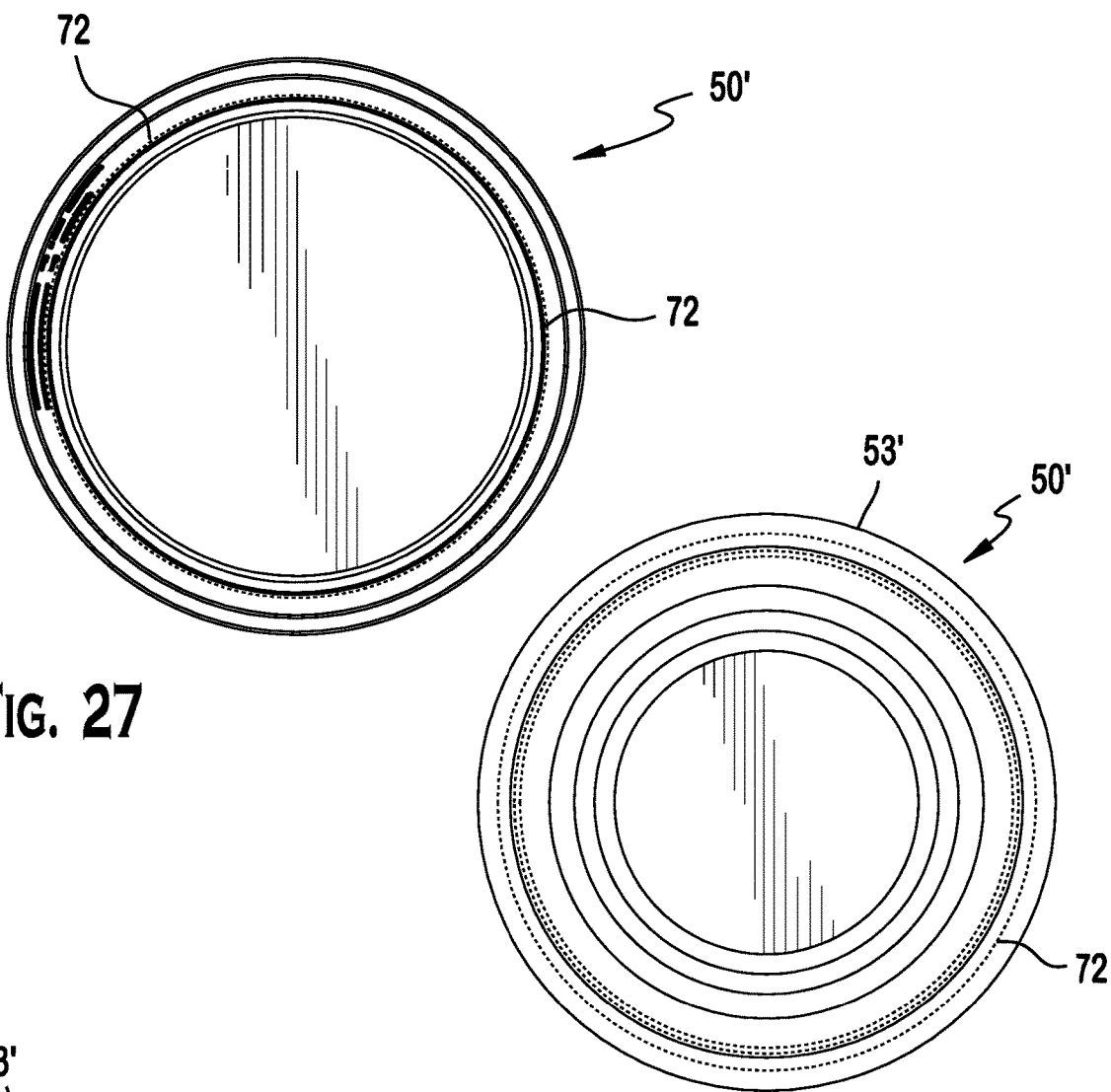
FIG. 27
FIG. 28
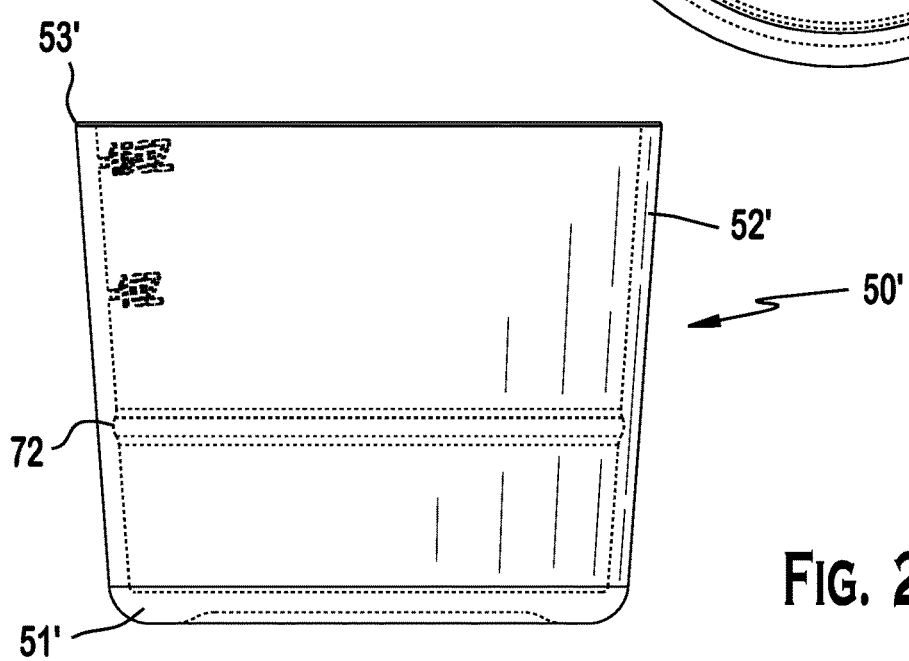
FIG. 29

MEASURING DEVICE ASSEMBLY

CROSS-REFERENCE TO RELATED APPLICATIONS

This application is a continuation-in-part of U.S. patent application Ser. No. 15/919,577, filed Mar. 13, 2018, which is a continuation of U.S. patent application Ser. No. 15/220,904, filed Jul. 27, 2016, which is a continuation of U.S. patent application Ser. No. 13/492,183, filed Jun. 8, 2012, now U.S. Pat. No. 9,428,303, claiming priority under 35 U.S.C. § 119.

FIELD OF THE INVENTION

The invention relates to a measuring device assembly and, more particularly, to a measuring device assembly having a container with a measuring receptacle connected thereto.

SUMMARY

A measuring device assembly having a container and measuring receptacle. The container includes a self-supporting base structure with a plurality of projections extending downward therefrom, wherein each projection of the plurality of projections includes a fastener receiving groove extending inward thereof. The measuring receptacle includes a receptacle base, a side wall extending from an upper surface of the receptacle base, and a fastener extending inward and secured in the fastener receiving groove.

BRIEF DESCRIPTION OF THE DRAWINGS

The invention will be explained in greater detail with reference to embodiments, referring to the appended drawings, in which:

FIG. 1 is a perspective of a measuring device assembly;

FIG. 2 is a side view of the measuring device assembly shown in FIG. 1;

FIG. 4 is a close up bottom view of a projection having a securing device recess to receive one of the plurality of securing devices of the measuring device assembly;

FIG. 5 is a close up perspective view of the projection of the container to which one of the plurality of securing devices and one of the plurality of removable measuring receptacles is secured;

FIG. 20 is a close-up perspective view of the measuring device assembly, showing a plurality of projections and measuring receptacles connected thereto;

FIG. 21 is an exploded sectional view of a projection and a measuring receptacle corresponding to the projection;

FIG. 27 is a top view of another measuring receptacle according to the invention;

FIG. 28 is a bottom view of the measuring receptacle of FIG. 27.

FIG. 29 is a side view of the measuring receptacle of FIG. 28.

DETAILED DESCRIPTION OF THE EMBODIMENT(S)

Figure 3:
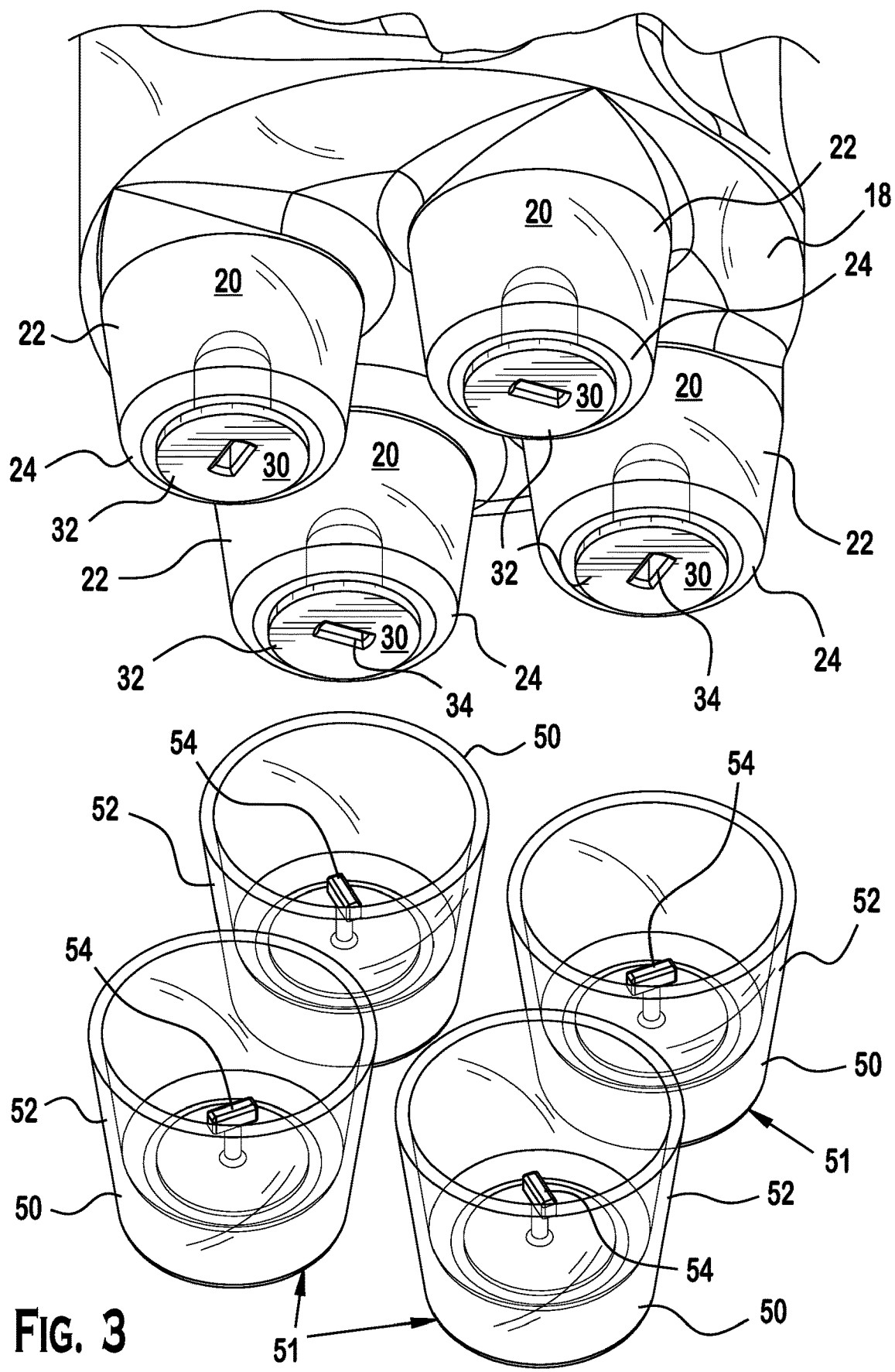
FIG. 3 is a bottom perspective view of a container, a plurality of securing devices, and a plurality of measuring receptacles according to the measuring device assembly shown in FIG. 1.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Hereinafter, a disclosure of a measuring device assembly 1 will be described with reference to the appended figures.

Referring first to FIGS. 1 and 2, the measuring device assembly 1 includes the following components: a container 10, a plurality of securing devices 30, and a plurality of measuring receptacles 50. In the embodiment shown, the container 10 receives the plurality of securing devices 30, which rotate to secure the plurality of measuring receptacles 50 to the container 10. Now each component will be further described.

As shown in FIGS. 1-3 and 6, the container 10 is a measuring device assembly—type container having a body 12 and an inner compartment 14. In an exemplary embodiment, the body 12 includes thinned walls of plastic or glass that form the inner compartment 14 into which a material M, such as a liquid or particulate, is held. The body 12 further includes a neck 16 positioned at one end of the body 12 and a base 18 at another end thereof, which is traditionally used to support the body 12. The body 12 further includes an opening and a passageway that leads from the neck 16 into the inner compartment 14. A cap 19 may be used to close the opening and entrap any material M positioned in the inner compartment 14

The body 12 generally has a substantially cylindrical shape with a screw threaded profile around the neck 16 so that the cap 19 can be removably secured to the body 12.

With reference to FIG. 3, the container 10 further includes a self-supporting base structure having a plurality of projections 20, which are integral with the body 12. In the embodiment shown, four projections 20 extend from the base 18 of the body 12. Each projection 20 includes an exterior wall 22, a support 24, and a recess 26. The exterior wall 22 extends from the base 18 and connects to the support 24. The support 24 is generally planar. In the embodiment shown, the exterior wall 22 is circular. However, it is possible that the another polygonal shape be utilized, and the skilled artisan would appreciate that each projection is not limited to a particular shape or size. In fact, multiple projections may have different sizes and shapes to accommodate different sizes and shapes of the measuring receptacles 50.

In the embodiment shown, the self-supporting base structure results from each of the projections having a planar bottom surface since the supports 24 are flat, parallel, and planar to each other. As a result, when the container 10 is positioned on table or counter, the container 10 is self-supporting. However, it is also possible that each projection 20 has a slightly hemispherical shape, between the exterior walls 22 and the support 24. In this case, it is also possible that the container 10 can be self-supporting.

As shown FIGS. 4 and 5, the projection 20 is shown, having a recess 26 extending from the support 24. The recess 26 is a cavity having supporting walls that extend into the body 12 to form the cavity. In the embodiment shown, the supporting walls are cylindrical, starting from support and extending to a domed end section, which is keyed to match the shape of a securing device 30 (which will be described later). However, it is possible that other polygonal shapes may be utilized, and the skilled artisan would appreciate that each recess 26 have is not limited to a particular shape or size. In fact, multiple the recess 26 have may have different sizes and shapes to accommodate different sizes and shapes of the securing device 30. The securing device 30 is adapted to communicate with recess 26 such that the securing device 30 is snug fit with the supporting walls of the recess 26.

Figure 6:
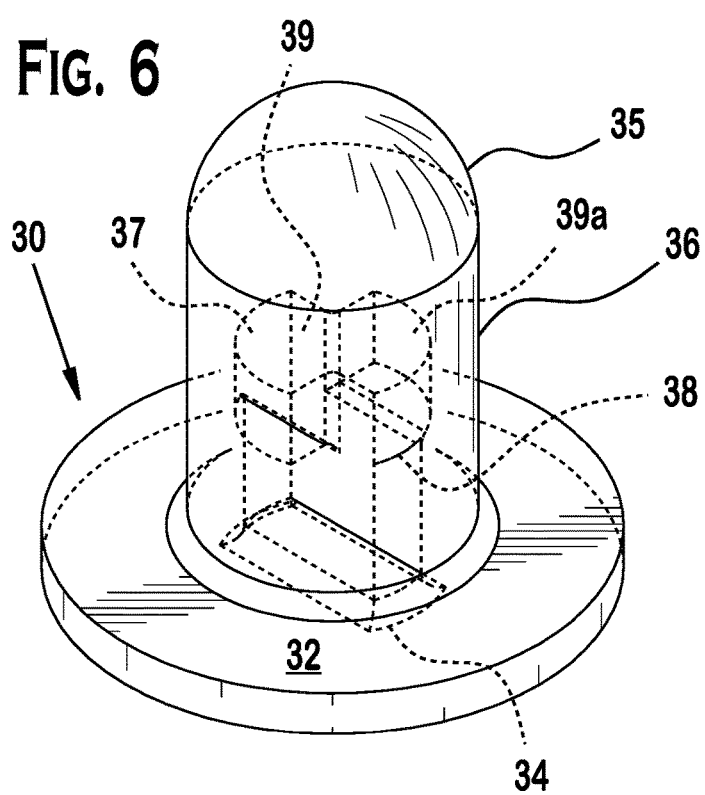
FIG. 6 is a perspective view of a securing receptacle of the measuring device assembly.
Figure 7:
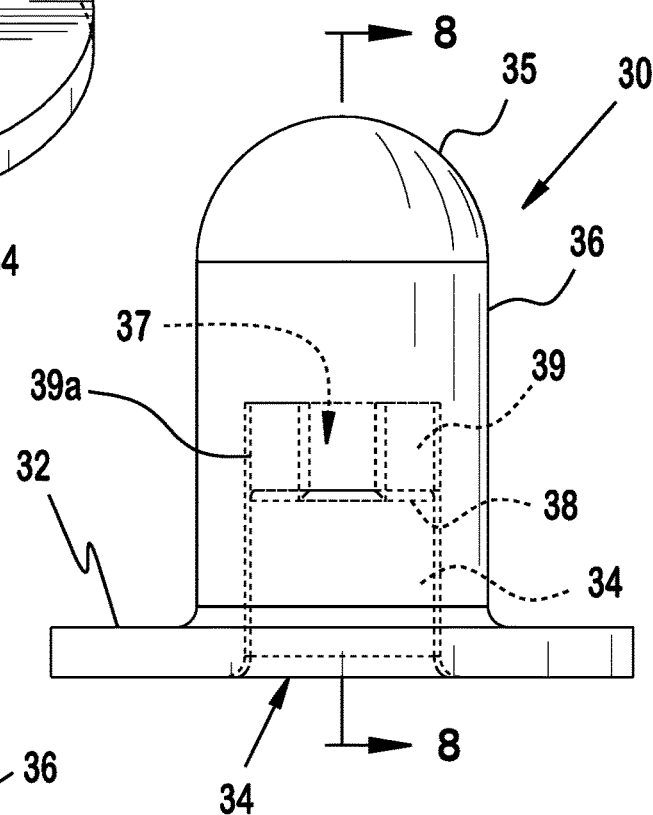
FIG. 7 is a side view of the securing receptacle shown in FIG. 6.
Figure 8:
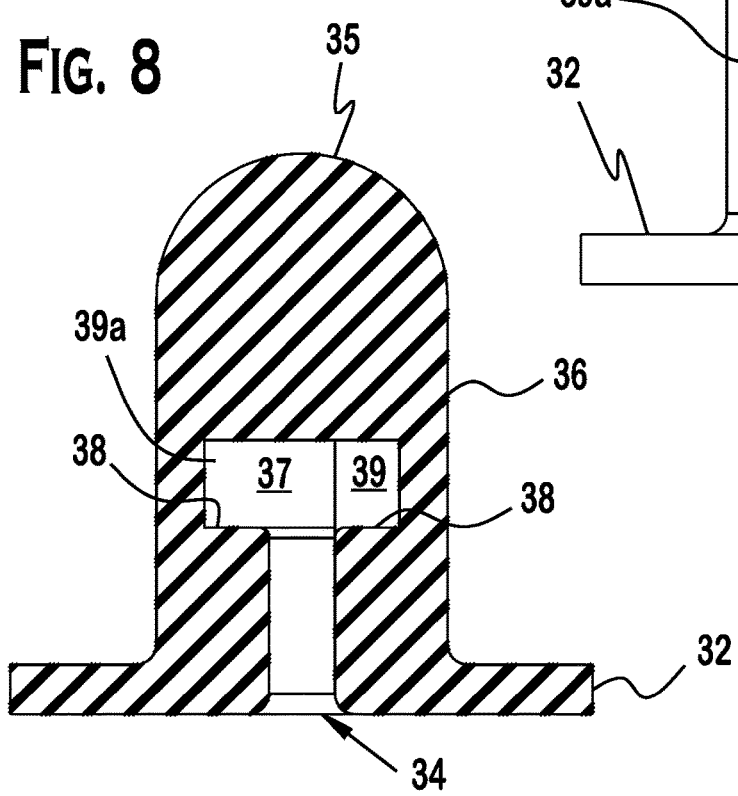
FIG. 8 is a sectional side view of the securing receptacle shown in FIG. 7.

As shown, in FIGS. 6 through 8, the securing device 30 includes a base 32, a receiving passageway 34, and a fitting member 36. The base 32 is a flat planar surface, with the fitting member 36 extending from the base 32. In the embodiment shown, the fitting member 36 is an elongated hollow member, extending from the base 32 and has a hemispherical crown wall 35. However, in the shown embodiment it is shaped to fit the recess 26. Nevertheless, the shape and dimensions of the fitting member can be modified such that the fitting member 36 is adapted to the shape and dimensions of the recess 26. The receiving passageway 34 is a slot extending through the base 32 and into the fitting member 36. The receiving passageway 34 is sized to receive the securing mechanism 54 such that the securing mechanism 54 can freely pass through the base 32 and into the fitting member 36.

In general, the securing device 30 is keyed shaped to snug fit with the recess 26. In particular, in the embodiment shown, fitting member 36 bias the supporting walls of the recess 26 when the fitting member 36 is positioned in the recess 26, and the base 32 sits flush with the support 24 (see FIG. 5).

The fitting member 36 includes a receiving chamber 37 within the fitting member 36 and is accessible through the receiving passageway 34, a retaining wall 38, and a stop 39. The receiving chamber 37 is a cavity within the fitting member 36, which is bound by the retaining wall 38, the stop 39, and inner walls 39*a* (i.e. body of the fitting member 36. In the embodiment shown, the receiving chamber 37 has a width that is equal to or larger than the receiving passageway 34 that extends from the base 32 through the fitting member 36 and into receiving chamber 37. In general, the receiving chamber 37 is shaped and sized to accommodate the securing mechanism 54. The retaining wall 38 is part of the body of the fitting member 36, and is a horizontal support in the receiving chamber 37 surrounding the receiving passageway 34. The stop 39 is also part of the body of the fitting member 36. The stop 39 is a vertical support wall that extends from the retaining wall 38 and extends laterally from the inner walls 39*a* into the receiving chamber 37 and toward the receiving passageway 34; such that the stop 39 can limit rotation of the securing mechanism 54 when the securing mechanism is positioned in the receiving chamber 37. In the embodiment shown, there are two stops 39 positioned within the receiving chamber 37.

In the embodiment shown, for example, in FIG. 8, the receiving chamber 37 does not extend to the crown wall 35, so the receiving chamber 37 is wholly contained in the fitting member 36, in the embodiment shown.

Figure 17:
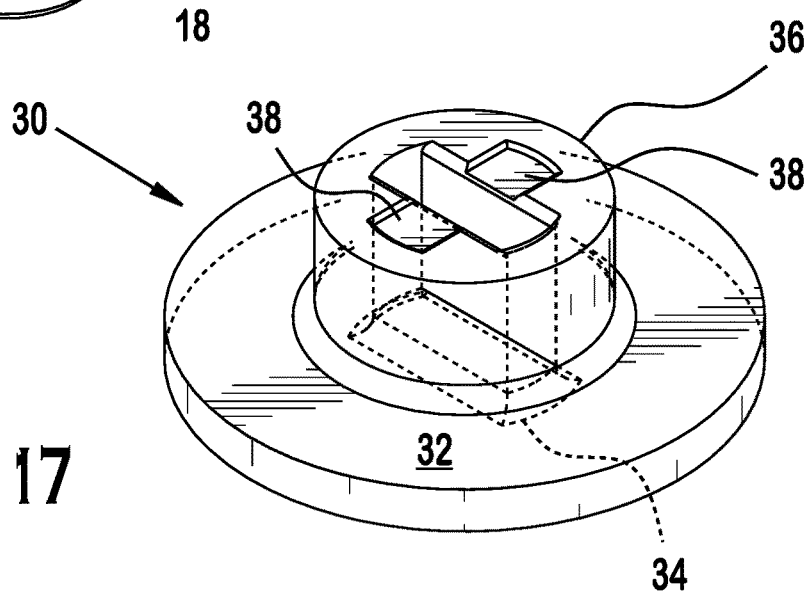
FIG. 17 is a perspective view of a securing device according to the invention.
Figure 18:
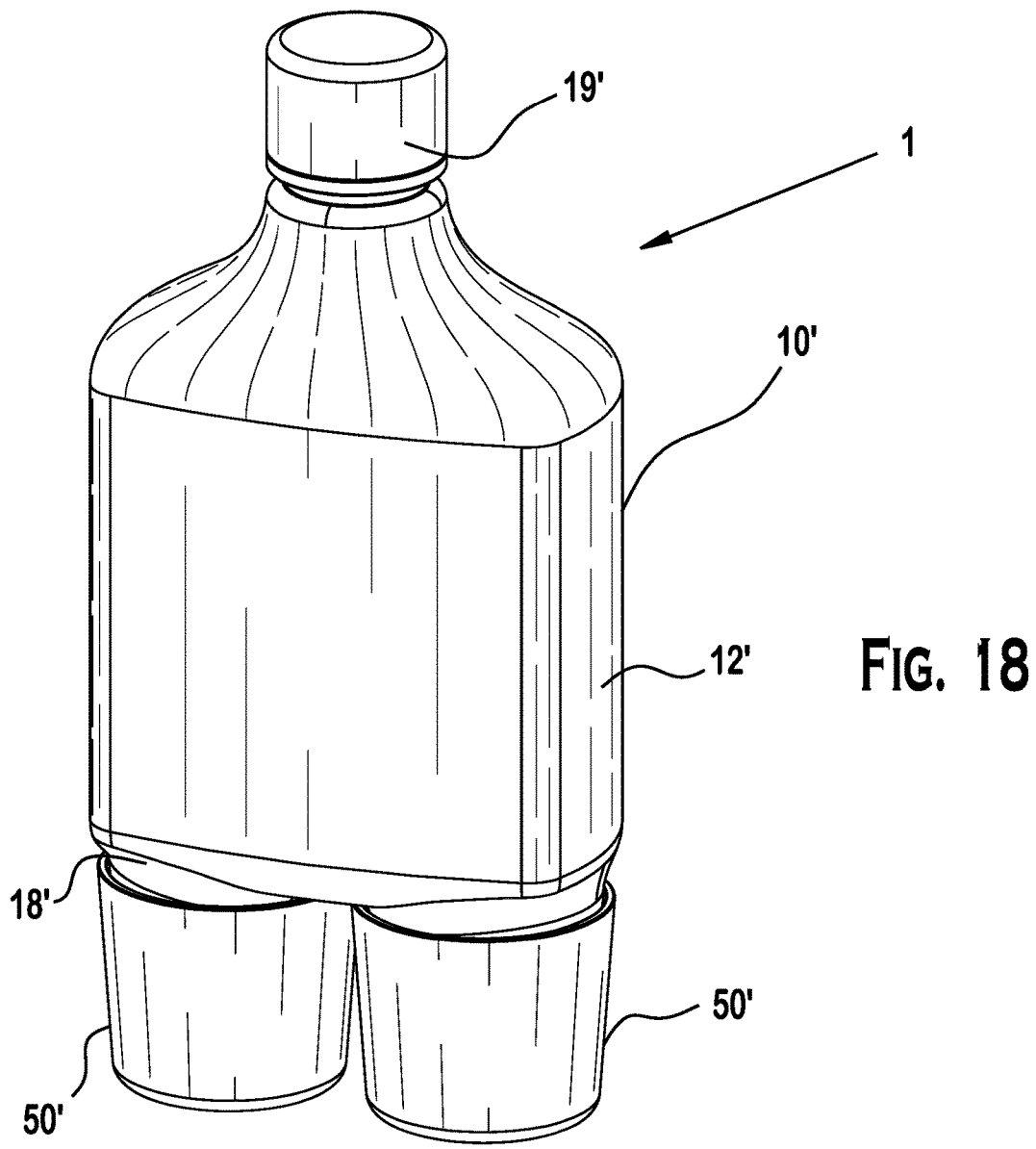
FIG. 18 is a perspective view of another measuring device assembly according to the invention.
Figure 19:
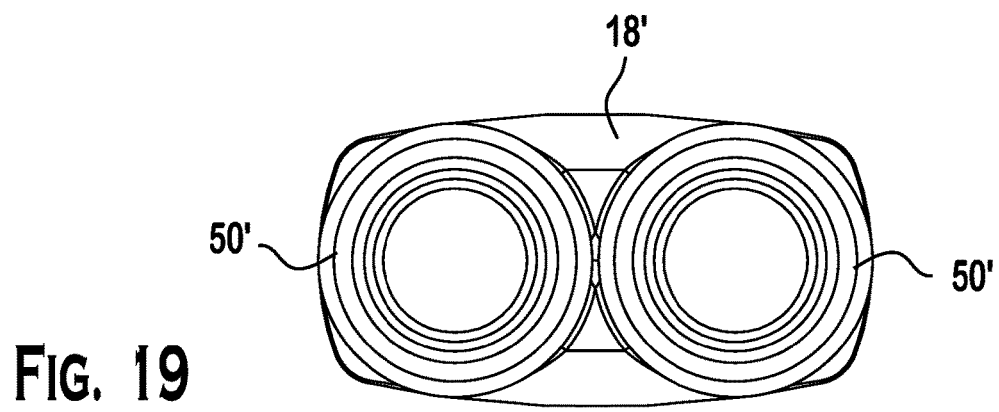
FIG. 19 is a bottom plan view of FIG. 18.
Figure 22:
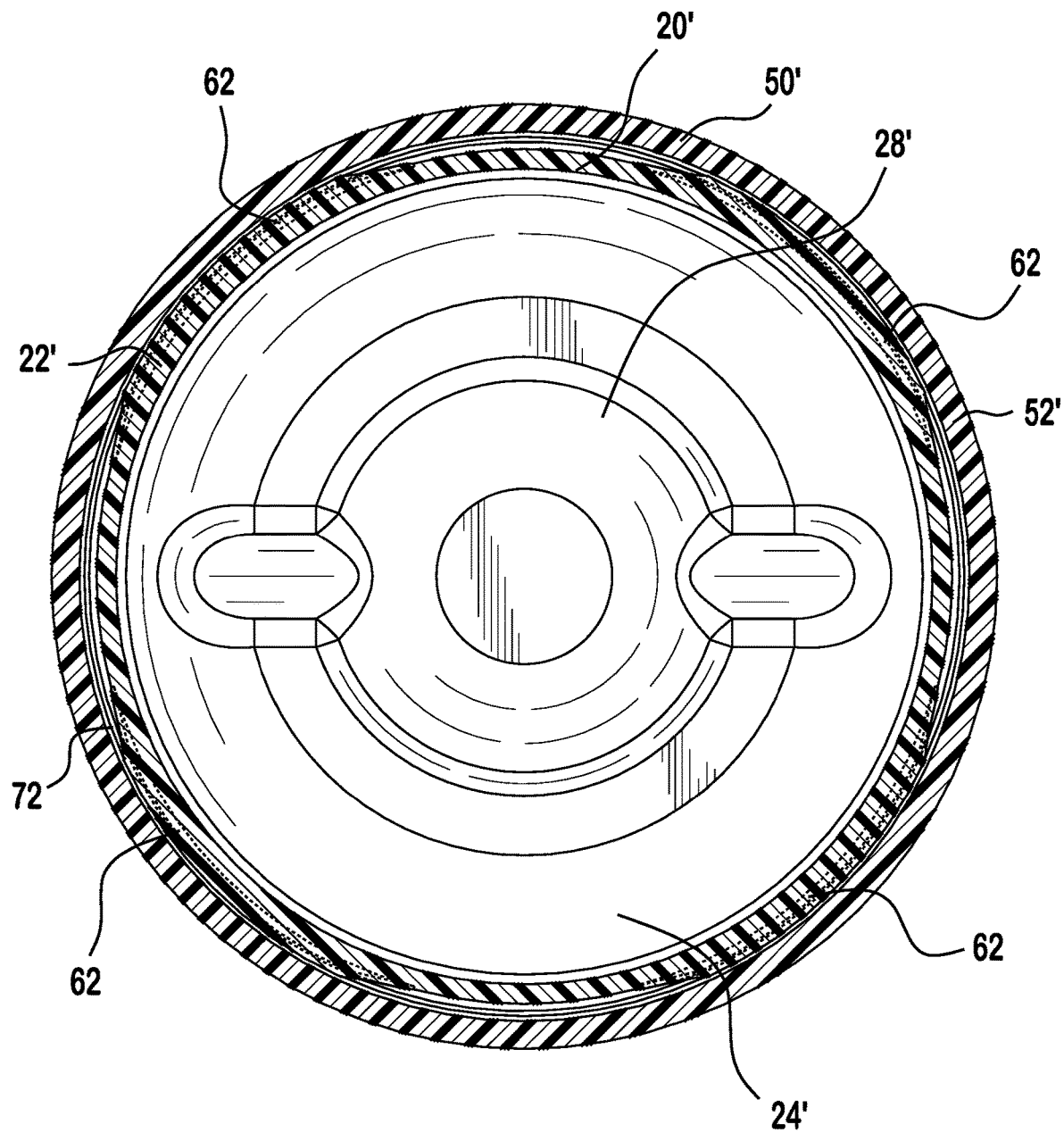
FIG. 22 is a sectional view of the projection and measuring receptacle of FIG. 20, taken along line 22-22.
Figure 23:
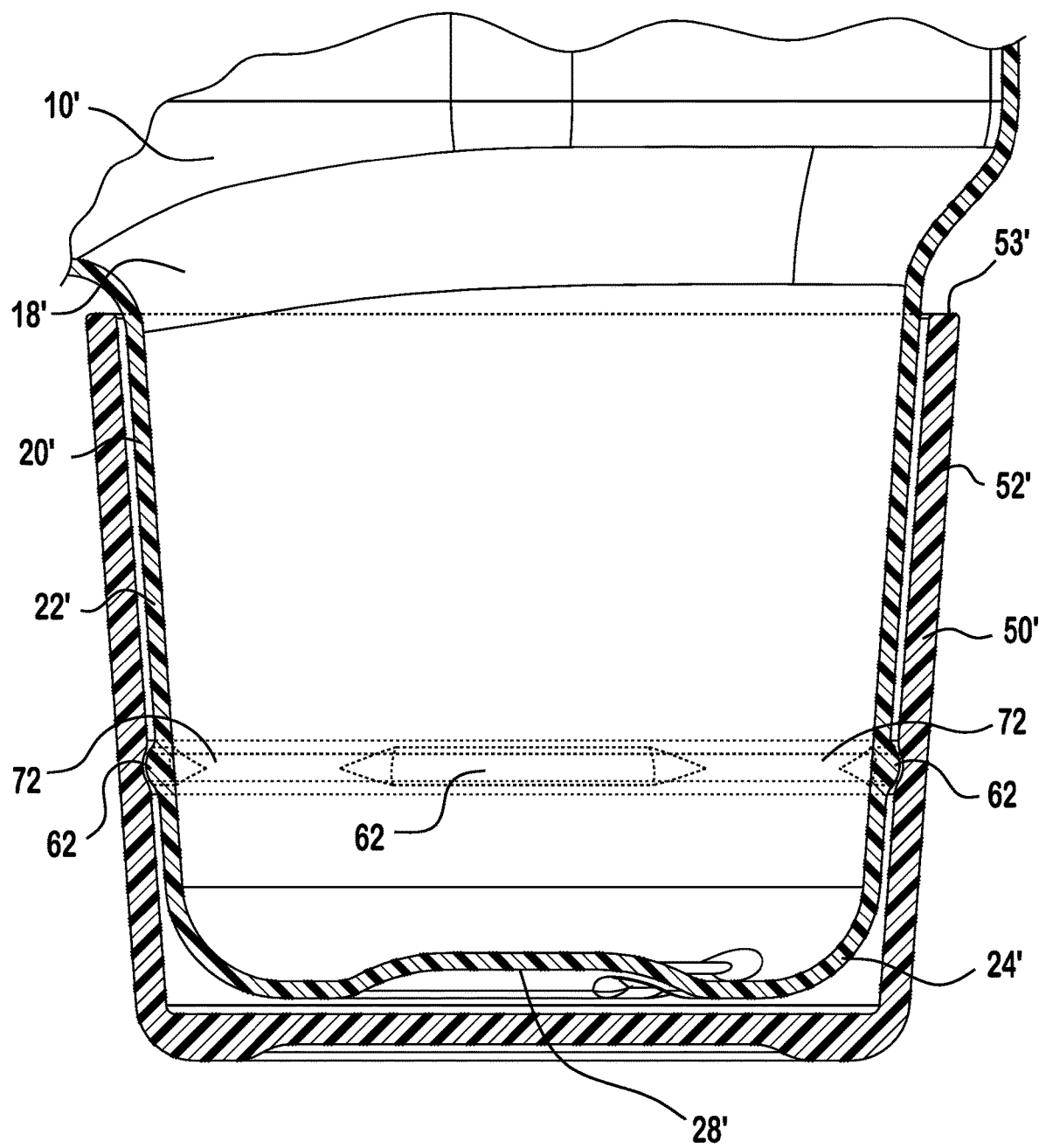
FIG. 23 is a sectional view of the projection and measuring receptacle of FIG. 20, taken along line 23-23.
Figure 24:
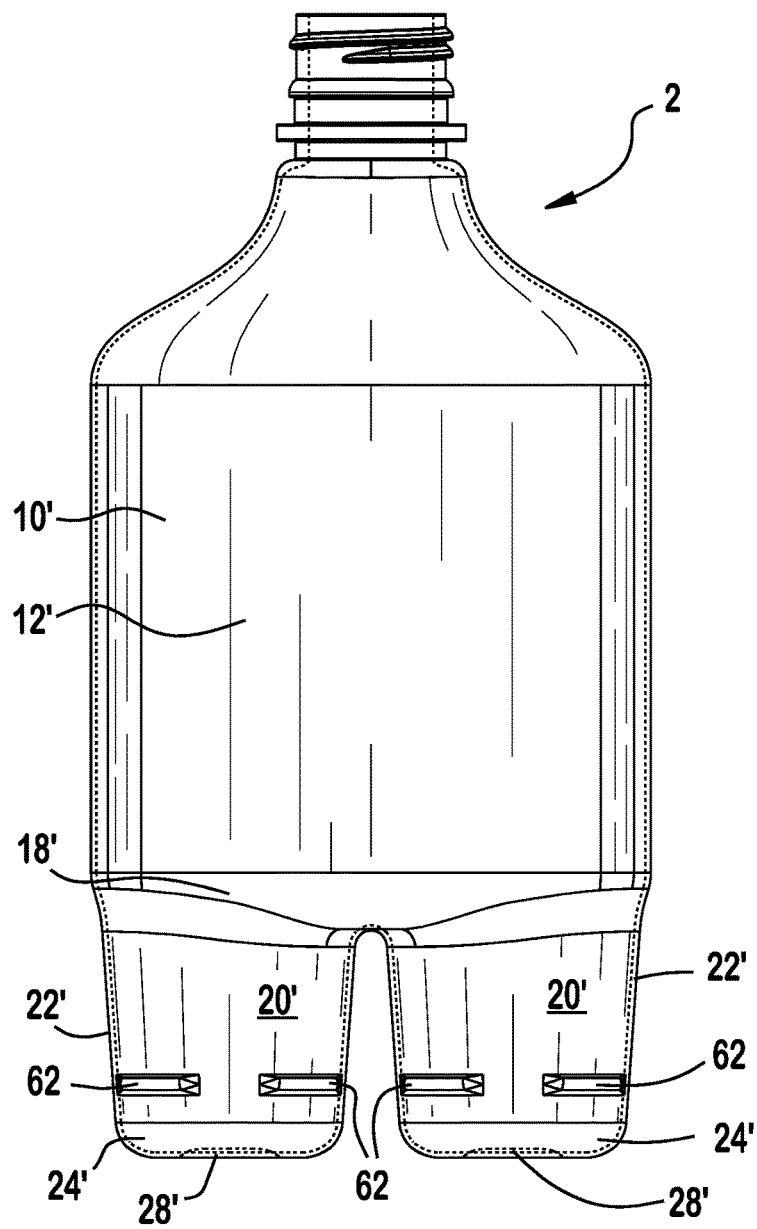
FIG. 24 is a front view of another container according to the invention.
Figure 25:
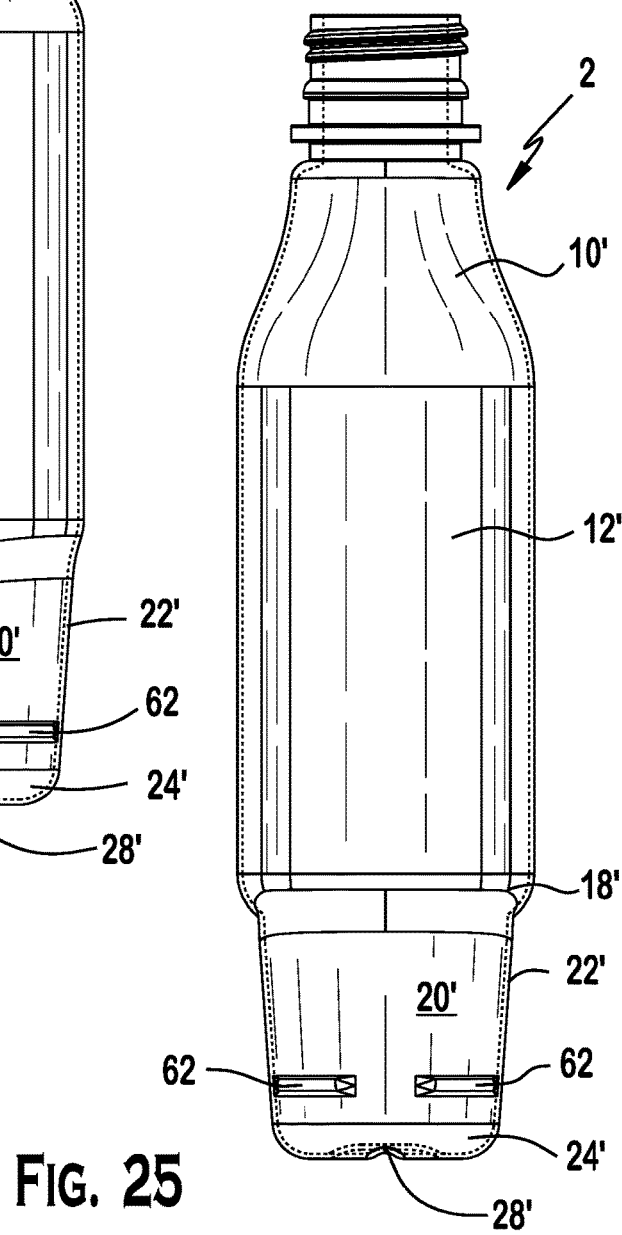
FIG. 25 is a side view of the container of FIG. 24.
Figure 26:
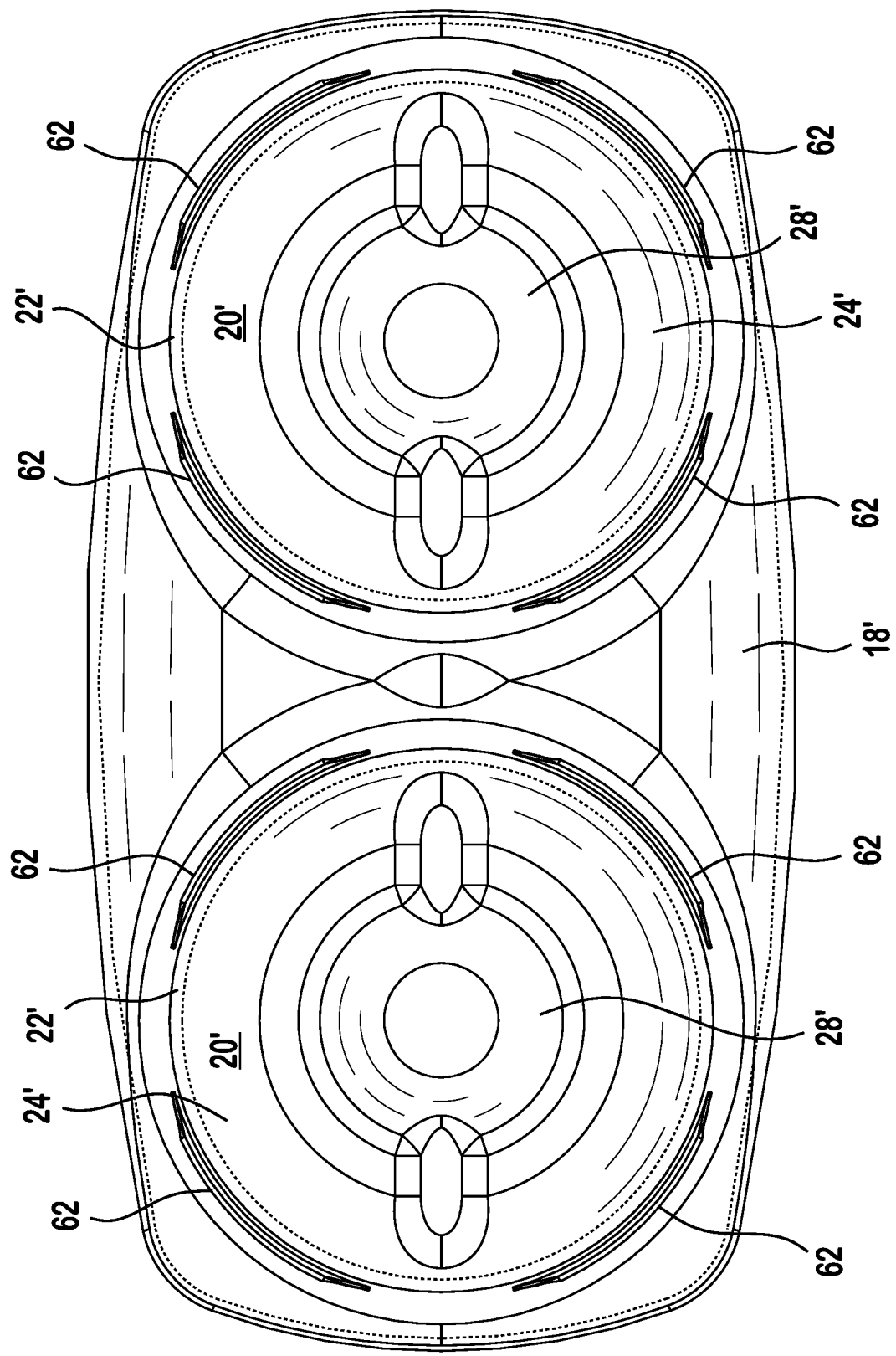
FIG. 26 is a bottom view of the container of FIG. 24.

In another embodiment, shown in FIG. 17, it is possible that fitting member 36 does not include the receiving chamber 37. Rather, the receiving passageway 34 extends completely through the fitting member 36, and the retaining wall 38 is positioned just below a horizontal top surface of the fitting member 36. The retaining wall 38 is a type of detent 22 system that prevents movement of the securing mechanism 54 when positioned through the receiving passageway 34. Therefore, the fitting member 36 includes a flat planar upper surface with a protuberance(s) or a divot(s) that acts like a catch.

In the embodiment shown, the securing device 30 is made of plastic, such as rubber, and formed with mating surfaces, shaped to match internal surfaces of the recess 26. The fitting member 36 frictionally engages the securing device 30 with the recess 26, since the fitting member 36, in the embodiment shown, is elastically deformable and sized slightly larger than then recess 26. Therefore, when the fitting member 36 is positioned in the recess 26, the fitting member 36 is snug fit with the container 10. The fitting member 36 elastically deforms to first fit within the recess 26 and then biases the walls of the recess 26 to secure the securing device 30 with the container 10.

If the securing device 30 is elastically deformable, then it is also possible to use an adhesive to secure the fitting member 36 in the recess 26. In addition, it is also possible in other exemplary embodiments that the structural elements of the securing device 30 are incorporated into the projection 20. For instance, the receiving passageway 34 and the retaining wall 38 may be incorporated into an integral design of the projection 20.

As shown in FIG. 5, the measuring receptacle 50 includes a base 51, a securing mechanism 54 positioned on the base 51, and a side wall 52 extending from the base 51 and surrounding the securing mechanism 54. In the embodiment shown, the side wall 52 is circular in cross-section, sloping downward from a lip 53 to the base 51, and takes shape and dimensions of a known shot glass. However, the measuring receptacle 50 includes a securing mechanism 54 either integrally formed with or secured to the base 51.

Figure 9:
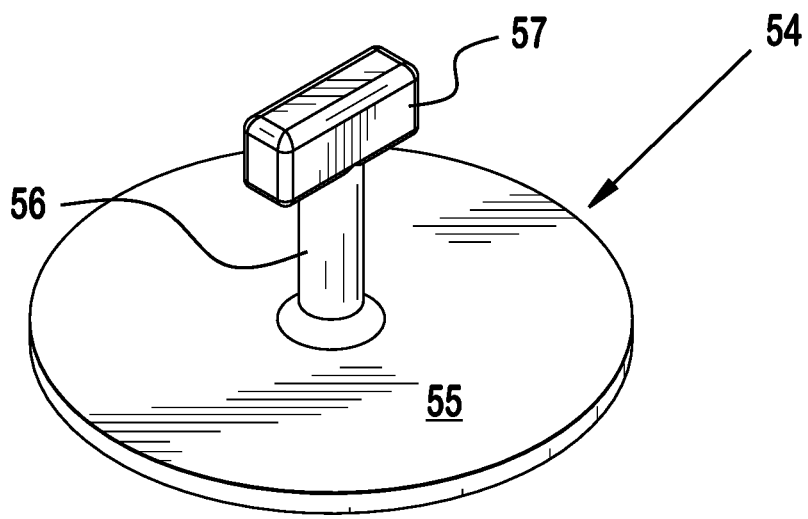
FIG. 9 is a perspective view of a securing mechanism of a removable measuring receptacle.
Figure 10:
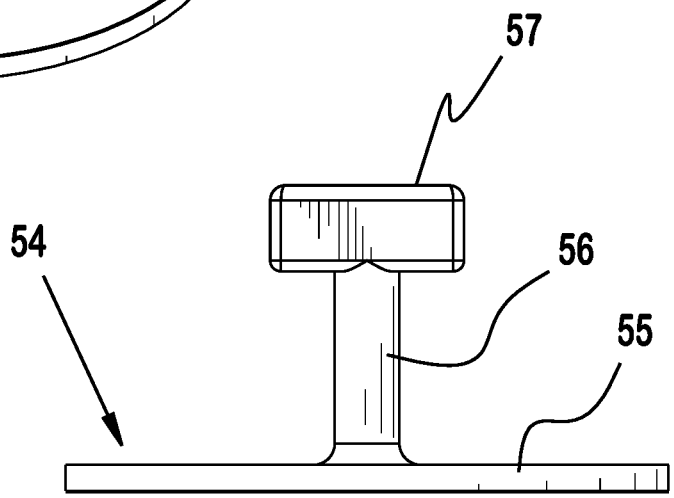
FIG. 10 is a side view of the securing mechanism shown in FIG. 9.
Figure 11:
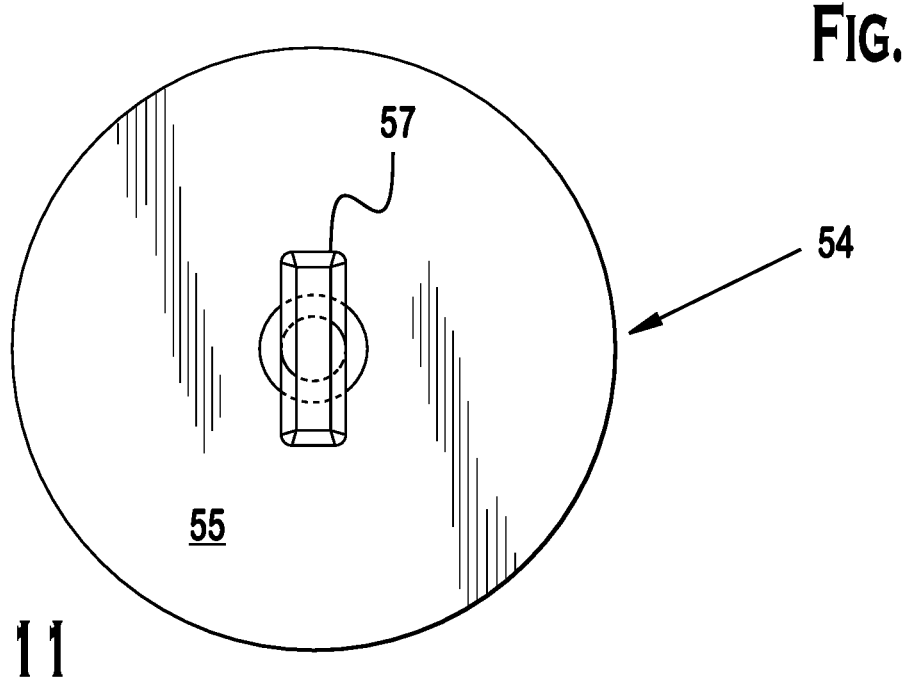
FIG. 11 is a top view of the securing mechanism shown in FIG. 10.

With reference to FIGS. 9 through 11, the securing mechanism 54 is shown, which includes a connection member 55, an extension 56, and a retaining member 57.

In the embodiment shown, the connection member 55 is a planar element connecting the securing mechanism 54 to the base 51. The extension 56 is an elongated member extending from the connection member 55 to the retaining member 57, and provides a set distance between the connection member 55 and the retaining member However, in other embodiments, it is possible that the connection member 55 may be omitted and the extension 56 connects directly to the base 51.

The extension 56 and the retaining member 57 in the embodiment shown are generally circular shaped shaft members that orthogonally connect with each other. However, the shape and the angle at which the two elements connect are not limited to this. Rather, the shown extension 56 and retaining member 57 are just one possible configuration, and a combination of elements may be designed to key with the securing device 30 in order to secure the measuring receptacle 50 and the container 10. The extension 56 and the retaining member 57 are dimensioned to fit into and through the receiving passageway 34, such that a length $L_e$ of the extension 56 is equal to or longer than a length $L_r$ of the receiving passageway 34. Therefore, the retaining member 57 may be positioned just above the retaining wall 38 when the extension 56 and the retaining member 57 are fitted through the receiving passageway 34. Since the securing device 30 is made from an elastically deformable material, such as rubber, the length $L_e$ of the extension 56 may be less than the length $L_r$ of the receiving passageway 34, and the difference in length $L_e$ of the extension 56 and the length $L_r$ of the receiving passageway 34 may be made up by deformation of the elastically deformable securing device 30.

Additionally, a width $W_m$ of the retaining member 57 is at least less than a width We of the receiving chamber 37, such that the retaining member 57 can freely rotate in the shown embodiment.

In the embodiment shown, the side wall 52 and the base 51 are dimensioned and shaped such that the measuring receptacle 50 conforms and fits snug with the projection 20 when the securing mechanism 54 is fitted and secured to the securing device 30.

Figure 14:
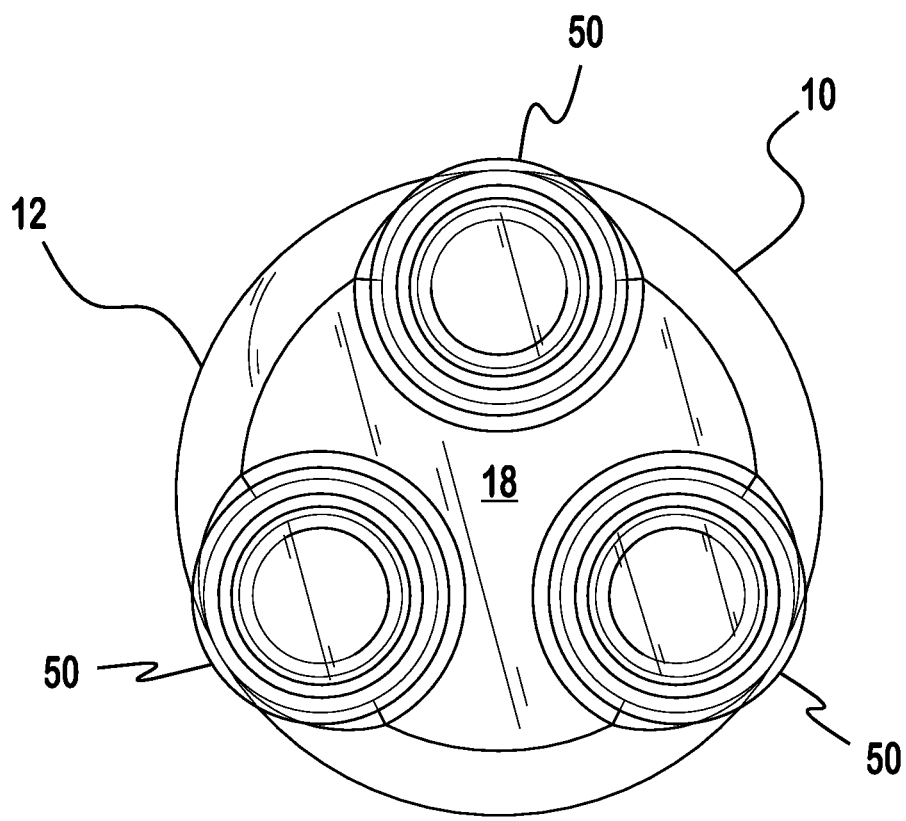
FIG. 14 is a bottom view of another measuring device assembly.
Figure 15:
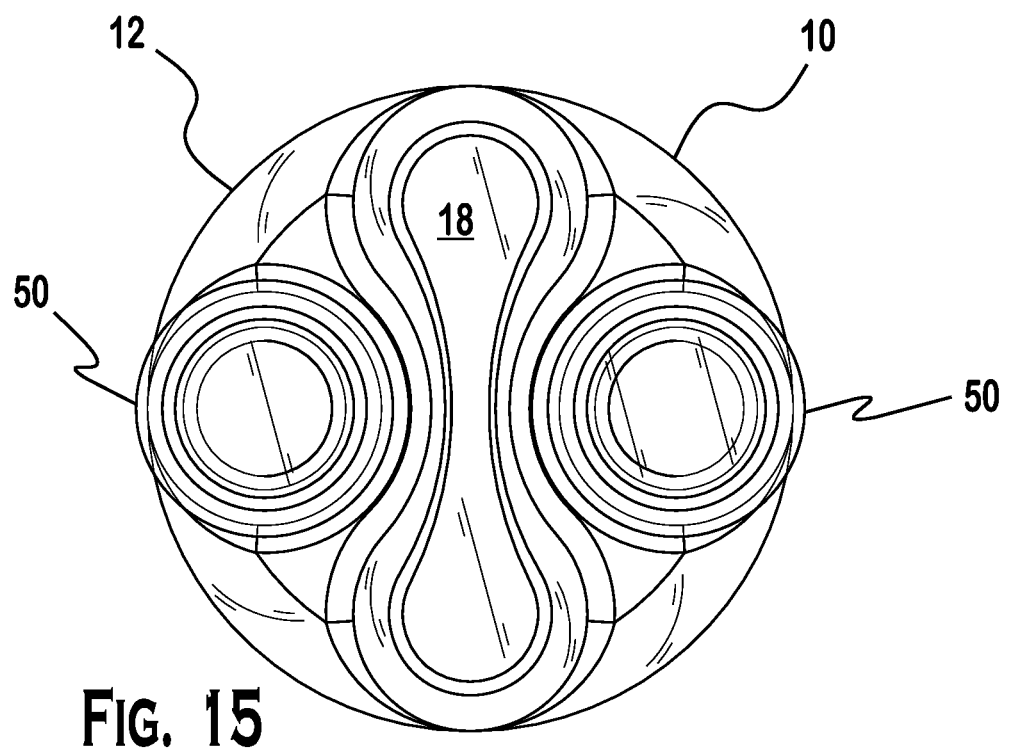
FIG. 15 is a bottom view of another measuring device assembly.
Figure 16:
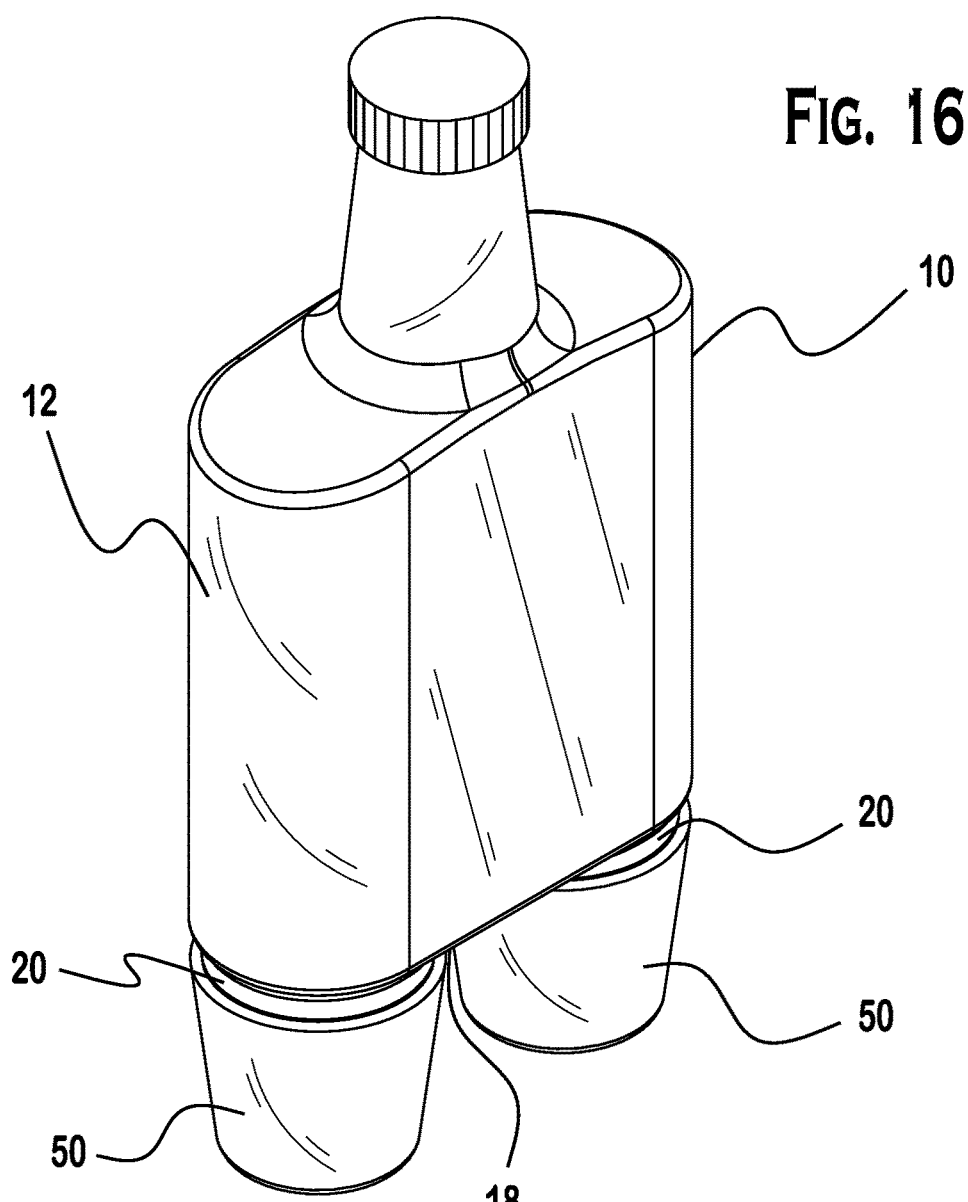
FIG. 16 is a bottom view of another measuring device assembly with a plurality of projections to which measuring receptacles are secured.

Now with reference to FIGS. 14 through 16, several embodiments of the measuring device assembly 1 are shown. In particular, various shapes and numbers of projections 20, securing devices 30, and measuring receptacles 50 are provided in the different embodiments.

Figure 12:
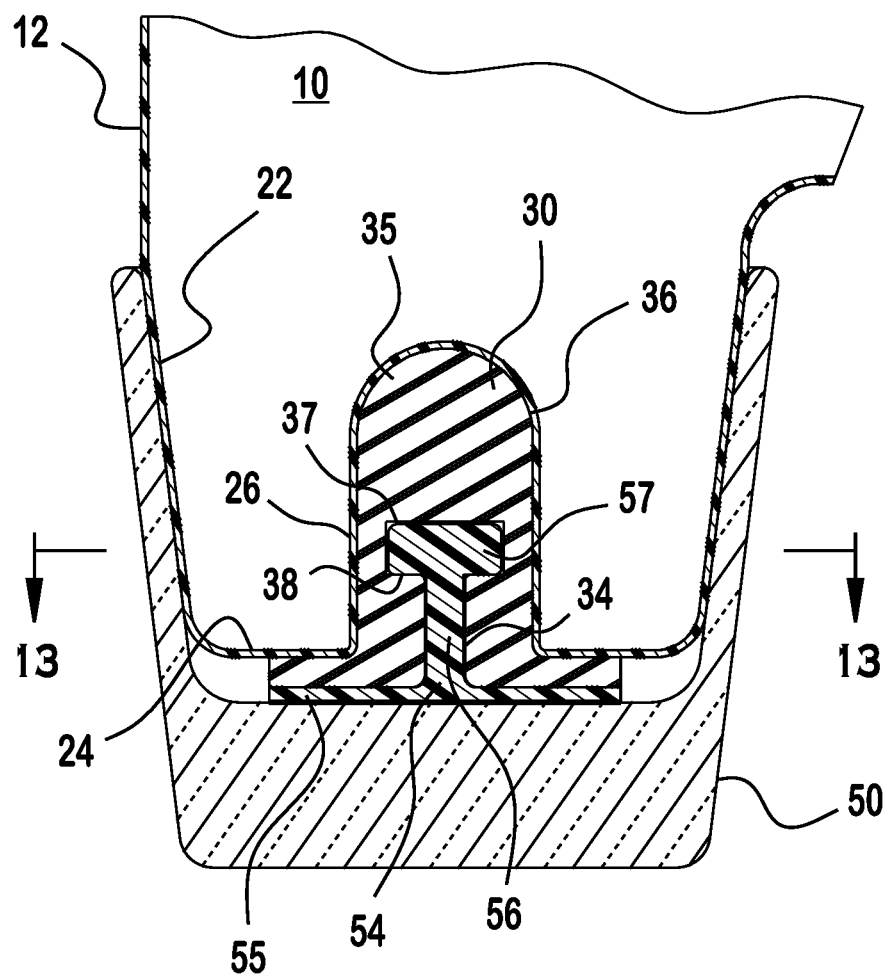
FIG. 12 is a sectional side view of an assembly of the container, the securing device, and the removable measuring receptacle of the measuring device assembly shown in FIG. 1.
Figure 13:
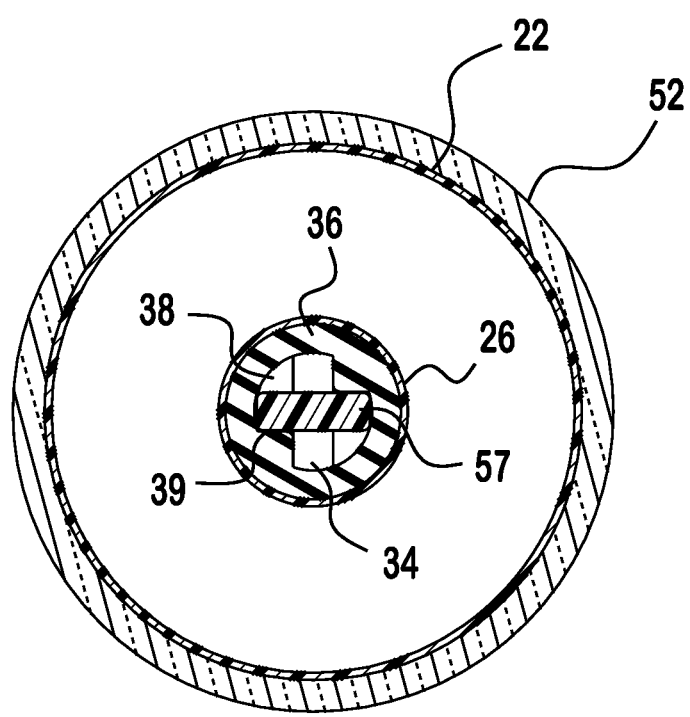
FIG. 13 is a sectional top view of the container, the securing device, and the removable measuring receptacle shown in FIG. 12.

Now with reference to FIGS. 12 and 13, a discussion on how the container 10, the plurality of securing devices 30, and the plurality of measuring receptacles 50 connect together to provide an assembled measuring device assembly 1 will be discussed.

As discussed above, the container 10 includes one or more projections 20 having the recess 26. The securing device 30 is fitted into the recess 26, and then secured either by friction fit or by adhesive. Other known ways to secure the securing device 30 in the recess 26 may be used, including multi-shot molding or fastening mechanisms. It is also possible that the structural elements of the disclosed securing device 30, include the receiving passageway 34, receiving chamber 37, retaining wall 38, and stop 39 are included into an integrated design of the projection 20.

In the embodiment shown, the retaining member 57 is inserted into the receiving passageway 34. The extension 56 and the retaining member 57 fit through the receiving passageway 34. Therefore, the retaining member 57 may be positioned just above the retaining wall 38 when the extension 56 and the retaining member 57 are fitted through the receiving passageway 34. Accordingly, when the measuring receptacle 50 is pressed against the securing device 30, in the embodiment shown, the securing device 30 is elastically deformed and allows the retaining member 57 to enter the receiving chamber 37.

Once the retaining member 57 is positioned above a top surface of the retaining wall 38, the retaining member 57 is rotated until it is restricted from doing so by the stop 39, which is a wall orthogonal to the top surface of the retaining wall 38 in the embodiment shown. Now, the retaining member 57 abuts the top surface of the retaining wall 38 and the stop 39. The retaining member 57, and notably the measuring receptacle 50, is secured to the container 10.

If the fitting member 36 does not include a receiving chamber (see FIG. 17), then the retaining member 57 may be rotated until it is restricted from doing so by the retaining wall 38 shaped like a detent system that prevents movement of the securing mechanism 54.

Now, the retaining member 57 abuts the top surface of the retaining wall 38 and the stop 39. The retaining member 57, and notably the measuring receptacle 50, is secured to the container 10.

Since the securing device 30 is made of an elastic material, in the embodiment shown, the securing device 30 fits snug between the measuring receptacle 50 and the projection 20 of the container 10, with little movement or play.

When the measuring device assembly 1 is placed on a support surface, such as a table or furniture, the measuring receptacle 50 supports the measuring device assembly 1 upright, so the measuring device assembly 1 cannot fall over. However, the measuring device assembly 1 is fully capable of supporting itself, either using the projections 20 or when the projections 20 are assembled with the securing devices 30.

The shape and configuration of the container 10, securing device 30, and measuring receptacle 50 are not limited to that which is shown. Other configurations are possible, including types of connection mechanism used to secure the aforementioned elements function type and position on where each of the elements are assembled.

Referring to FIGS. 18-29, another embodiment of the invention is shown and generally includes a container 10', a plurality of projections 20', and a plurality of measuring receptacles 50'. For sake of brevity, this exemplary embodiment will be described as it differs with respect to the projections 20 and measuring receptacles 50 described above in FIGS. 1-17.

As shown, the container 10' receives the plurality of measuring receptacles 50', each measuring device 50' detachably secured to a projection 20' with a detent system 60, as described below.

With reference to FIGS. 20 and 21, each projection 20' extends from the base 18' of the body 12'. Each projection 20' includes an exterior wall 22', a support 24', but lacks a recess 26'. The exterior wall 22' extends from the base 18' and connects to the support 24'. The support 24' is generally planar. In the embodiment shown, the exterior wall 22' is circular. However, it is possible that the another polygonal shape be utilized, and the skilled artisan would appreciate that each projection is not limited to a particular shape or size. In fact, multiple projections may have different sizes and shapes to accommodate different sizes and shapes of the measuring receptacles 50'.

In the embodiment shown, the self-supporting base structure results from each of the projections having a planar bottom surface since the supports 24' are flat, parallel, and planar to each other. As a result, when the container 10' is positioned on table or counter, the container 10' is self-supporting. However, it is also possible that each projection 20' has a slightly hemispherical shape, between the exterior walls 22' and the support 24'. In this case, it is also possible that the container 10' can be self-supporting.

In FIGS. 18-20, 24, 26, the bottle 1 is shown having two projections 20'. It is understood by one of ordinary skill in the art that the base 18 may have a plurality of projections 20'. Each projection 20' includes an exterior wall 22a extending from the base 18 of the body 12 to a generally planar support 24'. Each projection 20' takes the shape and dimensions of a known shot glass and is generally circular in cross section. This embodiment does not include the recess 26 described above. Each projection 20' detachably mates with the measuring receptacle 50' described below.

As shown in FIGS. 20-27 and 29, each projection 20' is shown having a plurality of receiving grooves 62 extending inwardly from the exterior wall 22'. In the embodiment shown, each projection 20' includes four receiving grooves 62. However, one skilled in the art should appreciate other design combinations are possible. As shown, the plurality of the receiving grooves 62 are positioned at a uniform height along the exterior wall 22' and about a circumference of the projection 20'. With reference to FIGS. 21-26, this embodiment is further designed with cavity 28' on the interior wall of base 24'.

In the embodiment shown in FIGS. 18-29, the projections 20' correspond with the measuring receptacles 50'. Generally, the measuring receptacles 50' include a base 51' and a side wall 52' extending from the base 51'. In the embodiment shown, the side wall 52' is circular in cross-section, sloping downward from a lip 53' to the base 51', and taking the shape, proportions, and dimensions of a known shot glass or a non-sterile medicine cup.

The side wall 52' includes a securing mechanism 54' that is integrally formed and extends outward from the side wall 52'. With reference to FIGS. 20-29, the securing mechanism 54' in this embodiment is a fastener 72 encircling the circumference at the interior face of the side wall 52' of the measuring receptacle 50'. In the embodiment shown, the fastener 72 is sized and positioned at a uniform height from base 51' to correspond with the receiving grooves 62 of the projection 20'.

In the embodiment shown, the side wall 52' is dimensioned and shaped such that the fastener 72 fits snugly about the receiving grooves 62 to detachably secure the measuring receptacle 50' to the projection 20'.

Now with more specific reference to FIGS. 20-29, a discussion of how the container 10', the plurality of projections 20', and the plurality of measuring receptacles 50' interact to provide an assembled bottle 1 are set out. Additionally, a discussion is set out of the operation of the detent system 60 which operates through interaction of the receiving grooves 62 and the fastener 72. The term "detent system" describes a mechanism that temporarily keeps one part in a certain position relative to that of another, and can be released by applying force to one of the parts. In this embodiment, the detent system 60 secures the measuring receptacle 50' detachably to the receiving grooves 62 of projection 20'.

As discussed above, the container 10' includes a plurality of projections 20', each projection 20' having a plurality of receiving grooves 62 on the interior side wall 22a. In this embodiment, the fastener 72 of the measuring receptacle 50' is snapped into position about the receiving grooves 62 of the projection 20'. More specifically, when the measuring receptacle 50' is pressed about and against the projection 20', in the embodiment shown, the fastener 72 is elastically deformed and allows the fastener 72 to enter receiving grooves 62 The fastener 72 friction fits with the receiving grooves 62. As the fastener 72 completely encircles the interior of side wall 52' of the measuring receptacle 50', the plurality of receiving grooves 62 can be frictionally "snapped" into position without rotation or other fitting or alignment. Since the projection 20' and the measuring receptacle 50' are made of a suitably elastic material, in the embodiment shown, the fastener 72 fits snugly within the receiving grooves 62, resulting in little movement or play of the elements. The cavity 28' holds ambient air from between the outer wall of support 24' and the inner wall of base 51'. Thus, the measuring receptacle 50' is secured to the container 10' until such time as it is desirable to detach it.

At such time as it is desirable to detach the measuring receptacle 50' from the projection 20', a user applies a sufficient amount of torque to the measuring receptacle 50' to elastically deform the fastener 72 and frictionally release the receiving grooves 62, thus detaching the measuring receptacle 50' from the container 10'.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A measuring device assembly comprising:
    a container having a self-supporting base structure with a plurality of projections extending downward therefrom, each projection of the plurality of projections having an exterior wall extending downward to a closed support and fastener receiving groove extending inward from the exterior wall; and
    a measuring receptacle having a receptacle base, a side wall extending from an upper surface of the receptacle base, and a fastener extending inward and secured in the fastener receiving groove.

2. The measuring device assembly of claim 1, wherein the exterior wall extends from a base of a body of the container.

3. The measuring device assembly of claim 2, wherein each projection of the plurality of projections includes a plurality of fastener receiving grooves.

4. The measuring device assembly of claim 3, wherein each projection of the plurality of projections includes four fastener receiving grooves positioned there about.

5. The measuring device assembly of claim 3, wherein the plurality of fastener receiving grooves are positioned at a uniform height along the exterior wall and about a circumference of each projection.

6. The measuring device assembly of claim 3, wherein the fastener encircles a circumference along an interior face of the side wall of the measuring receptacle.

7. The measuring device assembly of claim 6, wherein the fastener is sized and positioned at a uniform height from the base to correspond with the plurality of fastener receiving grooves of one of the plurality of projections.

8. The measuring device assembly of claim 7, wherein the side wall is dimensioned and shaped such that the fastener fits snugly about the plurality of fastener receiving grooves to detachably secure the measuring receptacle to the projection.

\* \* \* \* \*